United States Patent [19]

Stowell

[11] 4,211,980
[45] Jul. 8, 1980

[54] METHOD OF CREATING AN ELECTRIC FIELD FOR SHARK REPELLENT

[76] Inventor: William R. Stowell, 7572 Trailwind Dr., Cincinnati, Ohio

[21] Appl. No.: 927,386

[22] Filed: Jul. 24, 1978

Related U.S. Application Data

[63] Continuation-in-part of Ser. No. 810,377, Jun. 27, 1977, abandoned.

[51] Int. Cl.$^2$ .......................... H04B 1/02; H05C 1/04
[52] U.S. Cl. .................................... 455/40; 455/100; 119/3; 49/59
[58] Field of Search .................. 325/28, 116, 118, 156, 325/180; 43/17.1; 49/59; 119/3; 340/4 E, 4 A, 12 R

[56] References Cited

U.S. PATENT DOCUMENTS

| | | | |
|---|---|---|---|
| 3,164,772 | 1/1965 | Hicks | 325/116 |
| 3,265,972 | 8/1966 | Curry | 325/28 |
| 3,683,280 | 8/1972 | Holt | 325/116 |
| 3,822,403 | 1/1974 | Coleman | 325/28 |

*Primary Examiner*—John C. Martin
*Assistant Examiner*—Tommy P. Chin
*Attorney, Agent, or Firm*—Anthony D. Cennamo

[57] ABSTRACT

Method for repelling sharks and the like by creating an electric field containing a zone about an anode and/or cathode electrodes submersed in salt water. A voltage gradient of sufficient magnitude to overstimulate the nervous system of a shark has been found. The applied voltage is insufficient to disturb most scaled fish and man. The electric field is determined by considering the free space solutions of Maxwell's electro-magnetic field equations. The d.c. square wave potential is applied to the electrodes for that period of time wherein electron flow from cathode to anode is continued. The square wave potential is maintained only long enough to allow nervecell response in a shark. It is turned on with a frequency near a shark's nervous system's normal frequency.

6 Claims, 10 Drawing Figures

METHOD OF CREATING AN ELECTRIC FIELD FOR SHARK REPELLENT

This application is a continuation-in-part of my pending application Ser. No. 810,377, filed June 27, 1977 now abandoned.

PRIOR ART

The prior art including the literature reveals many theories related in various apparatus, chemicals, etc., for repelling sharks. The most recent prior art applies the theory of propagating electromagnetic energy via an antenna in salt water. In actuality these systems apply an on-off (capacitor charge-discharge) d.c. electric voltage between two immersed electrodes. Such systems are found in U.S. Pat. Nos. 3,164,772; 3,683,280; and 3,822,403.

BACKGROUND

The biological and behavorial patterns of the various species of shark have been studied and reported in the literature. One such book entitled "Sharks, Skates, and Rays" edited by Perry W. Gilbert, and published in The John Hopkins Press, Baltimore, Maryland, presents and discusses in a highly scientific manner the 39 papers presented in the interdisciplinary symposium entitled "Current Investigations Dealing with Elasmobranch Biology" convened at the Lerner Marine Lab, Bimini, Bahamas, in January/February 1966. Other books such as "Cousteau", published by Doubleday, present the shark, its detection, and its repulsion in a layman's language. Many other publications such as "The Electric Sense of Sharks and Rays", by Ad Kalmijn, Journal of Exper. Biology, Vol. 55, Issue 2, October 1971 pages 371–385; and "The Vision of Sharks: a Perspective" by Samuel H. Gruber in Vol. XXX, No. 2, of the Department of Navy publication "Review" are of academic interest. Also noted are the references cited in the Gruber publication.

The aforementioned prior art purports "to stimulate the nervous system of sharks with electro-magnetic radiation" in that, "obviously the repelling or killing is not in the form of electrical shock xxx". The prior art, Hicks U.S. Pat. No. 3,164,772 further notes that, "direct current (non-interrupted) as well as alternating current", has no effect whatsoever on the sharks. The reference does not suggest that an electric field has an effect. As best can be understood these prior art systems are attempting to "propagate" in sea water on-off electrically current via an "antenna".

Initially, and avoiding the technical terminology normally associated with the propagation of radio waves, the prior art prevents the electric field from being sustained into the surrounding medium. Theoretically, there would be an electric field (current flow between two electrodes) immersed in a conductive medium if sufficient power were to be applied. This may require enormous power, nonetheless theoretically feasible. The large current flow in turn requires an electric field. Alternatively, the prior art seems to have stumbled on an alternative source of enormous power, i.e., the brute force of the surge of a discharging capacitor.

Specifically, it is advanced that a continous d.c. current (as measured at the power supply) will not affect a shark is attributed to the effects of ionic conductivity in a media having ions and electrons with differing mobilities. That is, a space charge region rapidly forms in the vicinity of the anode and/or the cathode structures that prevent the electric field from penetrating the conducting medium. Specifically, the pulse rates and pulse duration of the prior art have not been directed to coincide with measured brain wave frequencies (6–12 cps in sharks) and nerve cell response times (0.5 to 10 milliseconds in most living organisms).

SUMMARY OF INVENTION

The present invention comprises apparatus designed in accordance with free space electric field theoretical analysis to sustain an electrical field in a salt water media. The present invention comprises apparatus designed in accordance with free space electric field theoretical analysis to sustain an electric field in a salt water media for a short period of time. Also, the timing of field application and duration to specifically affect a shark's nervous system is critical to the invention. A potential gradient is maintained between a pair of immersed electrodes. In that the unusually high power simulated momentarily by the surge of a discharging capacitor is not needed, the apparatus in actual size is comparitively very small. The potential is applied to the electrodes for that period of time wherein electron flow from cathode to anode is continued. Prior to the buildup of the ion shield about the anode or cathode, the electric potential is terminated. The off-time of the application of d.c. potential is from 1 to 2 orders of magnitude that of the on-time The lower sensitivity level of 0.1 microvolts/cm of the sharks nervous system is exceeded by over six orders of magnitude by the momentarily applied potential to the electrodes. The magnitude of the potential is sufficient to cause the shark's nervous system to react negatively—thereby repelling the sharks.

In that voltage is not relied upon, i.e. that electric field, to repel sharks there is no danger or discomfort to the operator in the water.

OBJECTS

It is accordingly a principle object of the present invention to provide a new and improved d.c./electrode shark repelling system.

Another object of the invention is to provide such a system that considers the theoretical analysis of an electric field of free space to that of a salt water media.

Another object of the invention is to provide such a system that is more effective to repelling sharks and affecting other selected electro-sensitive creatures but having less adverse effects on man.

A further object of the invention is to provide such a system that is comparatively much smaller in component parts and considerably simpler in operation.

Other objects and features of the present invention will become apparent from the following detailed description when taken in conjunction with the drawings in which:

ANALYSIS OF INVENTION

As indicated, it has been found that a shark has a lower sensitivity of 0.1 microvolts/cm. That is, the shark is capable of sensing extremely weak electric signals and uses this sense to locate food. But yet what may initially appear to be inconsistant, it also has been noted in the publications that an electric current, whether continuous d.c. or alternating, will not affect a shark. As pointed out above this is only partially accurate.

The resolution is resolved by utilizing pulsed d.c. by creating an electric field about two electrodes in the water.

A review of the conduction process in an ionic media (e.g. salt water) demonstrates that a continuous direct current or alternating current will not sustain an electric field in the salt water. It is known that shortly after a voltage is applied between a pair of electrodes in a low pressure gas, a gaseous discharge is formed. By analogy, a neon tube has a low pressure gas discharge. In a d.c. glow discharge, an ionic space charge forms around the cathode and prevents field penetration much beyond a short distance from the cathode.

Figure 1:
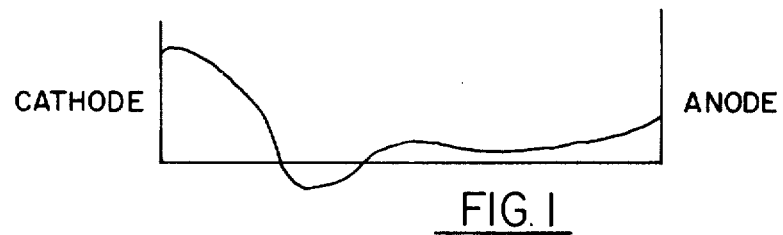
FIG. 1 is a graphical illustration of a voltage discharge curve.

A typical voltage curve is shown in FIG. 1. $E = vv$, except in the region near the cathode and near the anode, $E \approx 01$.

An analysis of the cathode region shows that there is a charge accumulation which shields the electrode.

The distribution of field in the cathode dark space has been found to be a linear function of the distance from the cathode and is expressed by $$E = C(d-x)$$

where d is the thickness of the cathode dark space and x is measured distance from the cathode. If the field distribution is linear, the potential distribution is $$V_x = \int_o^x E\,dx = C \int_o^x (d-x)\,dx$$

Integrating, $$V_x = C(xd - x^2/x)$$

At $x = d$ the potential $V_x$ is equal to the cathode drop $V_c$, so that $C = 2V_c/d^2$. Hence, $$V_x = V_c x(2d-x)/d^2$$

The constant C having been evaluated in terms of the cathode drop of potential and thickness, the field at any point is given as $$dV/dx = 2V_c(d-x)/d^2 = E$$

Differing this relation and setting it equal to $4\pi\rho$, the equation is $$d^2V/dx^2 = 2V_c/d^2 = 4\pi\rho$$

Thus, the charge density $\rho$ throughout the cathode dark space is constant and equal to $V_c/2\pi d^2$. It has shown that the cathode drop (which is easily measured experimentally) implies a charge density of $\rho = Vc/2\pi d^2$ to shield the cathode.

This shielding charge, however requires a finite amount of time to accumulate and until it accumulates, a field exists between the electrode and current flows. In contrast, to demonstrate the power required to maintain an electric field, consider the following:

$$\vec{J} = G\vec{E}$$

where
J = current density
G = conductivity
E = electric field in sea water, $G \approx 1/20$ mhos/cm for $E = 10$ v/cm, $J = 0.5$ amps/cm$^2$ now consider a crossection of 1 meter $\times$ 1 meter $= 10^4$ cm$^2$. This would require a total current of 5000 amps to maintain the field. Considering the power involved—assume a volume of salt water 1 meter $\times$ 1 meter $\times$ 1 meter—a field of $10^v$/cm has a total potential drop of 1000 V $\times$ 5000 A = 5 million watts. To deliver such a large amount of power would require an enormous supply.

However, free space, d.c. field configurations consume no power, since no charge is moved. In the time between the time at which voltage is applied and the charges (e.g. electrons and ions) begin to move, there is an electric field in the salt water. That is, during the time required for a space charge to accumulate, around the electrodes an electric field is present in the salt water encompassing electrodes.

From the above analysis it is demonstrated that an electric field may be maintained. The field, although it can not be maintained with a continuous or alternating voltage, may be created by a pulsed (on-off) direct voltage. That is, the instantaneous application for a short period of time will produce an electric field encompassing a pair of electrodes immersed in salt water.

The electric field will have a free space configuration. The ions which conduct charge do not travel with the speed of light whereas the magnetic and electric fields do travel at speed of light. Until the ions in the saltwater have had sufficient time to be displaced and thereby affect the original field; the field configuration is essentially a "free space" field.

The electric field although in terms of voltage and power is relatively insignificant, will be of a sufficient magnitude to disrupt the nervous system of a shark. The imposed current flow through the shark is sufficient to override its own nerve impulses.

Figures 2, 3, 4:
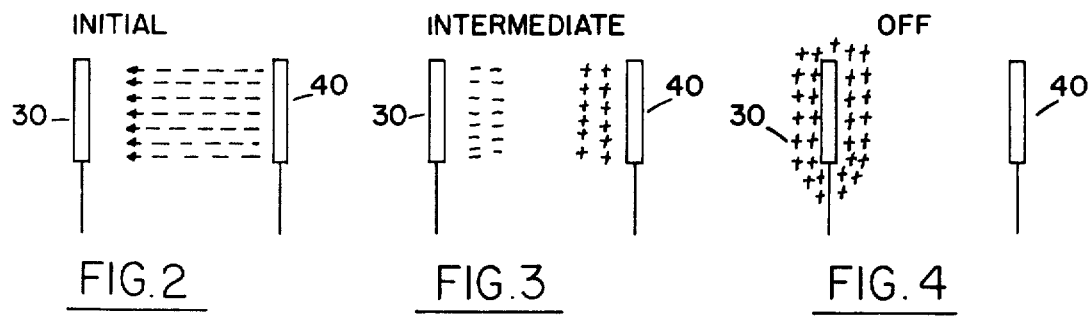
FIGS. 2, 3 and 4 illustrate schematically the electric field in three stages by the electron and ionic charge.

With reference to FIGS. 2, 3 and 4 there is illustrated schematically the existence of the electric field and subsequent self termination of the electric field.

The cathode 10 is depicted as the negative electrode whereas the anode 20 is depicted as the positive electrode. An electric field by definition herein is that potential gradient that initially occurs between two electrodes. As known in theory there will be an electron flow from the cathode to the anode is orders magnitudes greater than the ion flow from the anode to the cathode.

As shown in FIG. 2 upon the intial application of a voltage to the electrodes 30 and 40 there will be an electric field caused by the electron flow from the cathode to the anode. Hence, at this instant of time there will be an electric field in the entire region about the anode and the cathode. At a substantially less velocity the ion flows from the anode to the cathode is similarly initiated.

With reference to FIG. 3, as the flow of ions continues there will be a build up of ions about the cathode. The build up of ions around the cathode continues until an ion shield is formed as shown in FIG. 4. The ion shield immeiately adjacent to the cathode in turn forms a potential barrier to the further flow of electrons from the cathode to the anode.

The ion shield creates a potential difference between the positive sheath and the negative cathode. Once the ion sheath is completed there no longer will be a potential difference between the anode and the cathode. Accordingly there is no longer an electric field between electrodes.

Upon the formation of the ion shield about the cathode the full force of the current flow is confined and concentrated into this relatively small area.

Upon termination of the application of the voltage to the electrodes the ions in the sheath are rapidly neutralized and the potential drops to zero.

Accordingly, upon reflection it may be seen that if the voltage potential (with a sufficient current capacity is applied to the electrodes for less than period of time necessary for the ion sheath build-up and the voltage is applied repetitively an intermittent electric field may be effectively maintained between the electrodes.

The application and the termination of the application of a potential is cyclically actuated.

The prior art's conclusion that there is no current flow between electrodes is "mostly" corrrect. Also the capacitor charge/discharge of a potential application for the creation of an electric field is partly correct. That is, theoretically there would be current flow between two electrodes immersed in a conductive medium if sufficient current/voltage were to be applied. This may require enormous power, nonetheless theoretically feasable.

The current flow in turn would create an electric field. Alternatively, the prior art seems to have stumbled on an aternative source of infinite power, i.e., the brute force of the enormous power surge of a discharging capacitor.

The present invention has measured an upper limit for that period of time necessary to form the aforementioned ion barrier of approximately 200 milliseconds. This period of time is in actuality a very small portion of that of the prior art brute force capacitance discharge. In this way the apparatus of the instant invention in size and capacity is comparitively very small.

Figure 5:
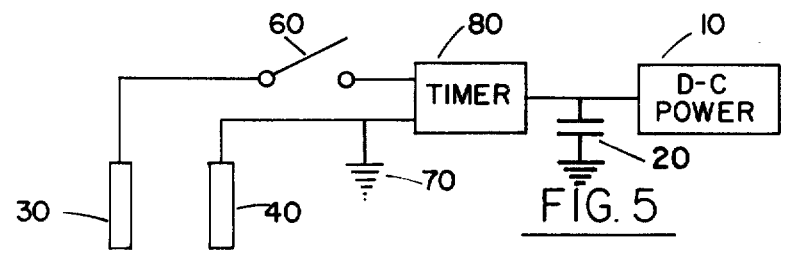
FIG. 5 depicts an actual embodiment of the system and apparatus for the momentarily interrupted d.c. potential applied to the electrodes

With particular reference to FIG. 5 there is illustrated schematically the electrical circuitry of the present invention. The circuit comprises a battery 10, a capacitor 20, a switch 60, a timing circuit 80, ground 70, and the electrodes, further comprising the cathode 30 and the anode 40.

It may be stated initially the electrical/electronic circuit per se is more or less conventionally operable. Other circuitry may be substituted therefore to obtain the voltage time relationship.

In the initial constructed embodiments the voltage source 10 was found to be sufficient in the range of 45 to 225 volts. The level of the voltage utilized is, of course, directly related to the distance between the electrodes 30 and 40. The minimum distance being that sufficient for the sharks of varying sizes to penetrate the elctric field. The current in amperage was 10–30 amps.

The timing circuit 80 activates switch 60 to apply the d.c. voltage. The on-off of the d.c. potential is referred to as a d.c. square wave pulse.

The timing circuit 80 is operative to open and close the power switch 60. As indicated above the electric field between electrodes 30 and 40 can continue until an ion-shield is formed about the cathode to cut off the electron flow. This period of time has been measured to be less than in the order of 200 milli-seconds. The continuation of a potential exceeding this period of time is ineffectual—hence, a waste of power. This is, as pointed out above, a considerable contrast to the application of high voltage/high current pulses to effectuate by the brute force method a potential gradiation between electrodes.

To further improve the field vs. power ratio, the shark movement in water was taken into consideration in determining the frequency of the pulses. With a 130 milli-seconds off pulse and 20 milli-seconds on rate the repetition rate for a particular embodiment is computed at 6.66 cycles per second or a 13% duty cycle. A pulse duration of 7 milli-seconds with off time of 120 milli-seconds corresponding to frequency of 7.8 cps and a 5.5% duty cycle also proved effective when pulsed with 50 volts. At the 50 volt level, the range was approximately 2–3 feet. This, again, is relatively small compared to the toal discharge of a high energy capacitor of 1 to several times per second disclosed by the prior art.

Figure 6:
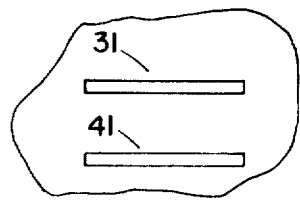
FIGS. 6, 6A, 6B, 6C and 6D depict various electrode geometry and positioning to control the pattern of the electric field.
Figure 6A:
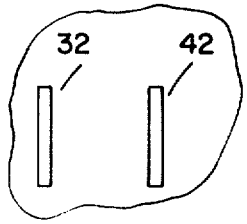
Figure 6B:
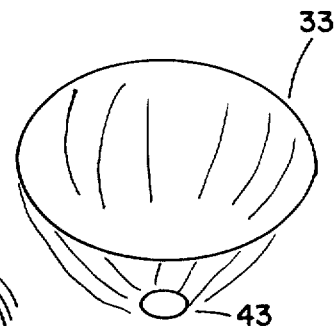
Figure 6D:
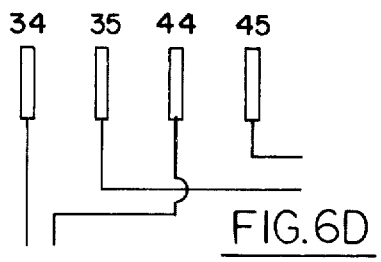
Figure 6C:
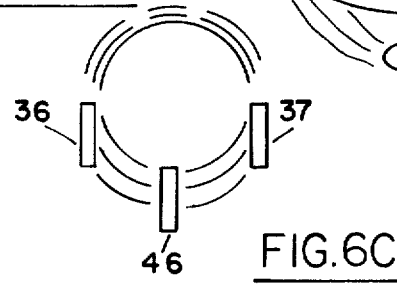

With particular reference to FIGS. 6, 6A, 6B, 6C and 6D there is illustrated varying patterns of electric fields. Horizontal electrodes 31 and 41 are illustrated in FIG. 6 together with its electric field pattern. In FIG. 6A the electrodes 32 and 42 are arranged in a vertical pattern. In FIG. 6B a ring 33 serves as a first electrode together with a second electrode 43 yields a particularly effective pattern for a human swimmer. In FIG. 6C multiple electrodes 36, 46, 37 are pulsed in pairs to yield a much broader geometric electric field pattern. The relatively short on-period in contrast to the off-period makes the system of the present invention particularly adaptable to pulsing an array of pairs of electrodes 34–44 and 35–45 as shown in 6D.

In an experimental configuration measurements of the electrical field in salt water were made. Utilizing a sensing probe spaced approximately fourteen inches (14") from the two electrodes, fields of 2 volts/cm in a square wave pulse of 5 ms duration were measured. An oscilloscope having a 10 mil. ohm input impedance was used for the field measurement.

The field of two volts/cm was measured on the sensing probe when a voltage of fifty volts (50 V) was applied to the electrodes. This voltage corresponds to a maximum field of 6 V/cm at the shortest distance between electrodes.

It may be particularly noted that at the measured distance of fourteen inches (14"), the field was twenty million times greater than the minimum field a shark can sense.

In another instance, utilizing the same electrodes at a distance of five to six feet from a shark, an applied voltage of 130 volts was effective. Fifty volts was effective at a two–three feet range.

The time required to build a shield charge will vary with the salt content in the ocean environment and the temperature of the water. It has been shown that a typical time period is in the order of 200 milli-seconds to build up the shield. The timing may be regarded therefore as minimal to affect a shark's nervous system.

Although only a certain and specific embodiment has been illustrated and theorized it is to be understood that modifications may be made without departing from the true spirit and scope of the invention.

I claim:

1. The method for repelling sharks and for affecting other selected electro-sensitive sea creatures through its nervous system utilizing a d.c. voltage source comprising:

applying a pulsed d.c. potential to establish electron and ion flow between a cathode and anode electrodes immersed in salt water, maintaining said d.c. potential on said electrodes 0.5 to 10 milli-seconds, which is less than the period of time to build up an ion shield about said cathode, said period of maintaining said d.c. potential is minimal to affect a shark's nervous system, spacing said pulsed d.c. potential to a repetition rate related to the natural frequency of the shark's nervous system (6–12 cycles per second), and discontinuing the application of said d.c. potential prior to said build up of said ion shield.

2. The method of claim 1 wherein said d.c. potential initiates electron flow from cathode to anode and an ion flow from anode to the cathode and wherein electron flow is several times said ion flow.

3. The method of claim 1 wherein the magnitude of said d.c. potential is related to the distance between said anode and said cathode.

4. The method of claim 1 wherein said d.c. potential applied to said anode and cathode is discontinued in the order of 50–200 milli-seconds between applications.

5. The method of claim 1 wherein said electron and ion flow between said cathode and anode is caused by an electric field about the cathode and anode.

6. The method of claim 1 wherein said application of voltage to said anode and cathode produces an electric field by considering the free space d.c. field configurations.

* * * * *